(12) United States Patent
Meyers

(10) Patent No.: US 7,623,029 B2
(45) Date of Patent: Nov. 24, 2009

(54) SYSTEM AND METHOD FOR LOT BASED PROCESSING AND TRACKING IN A CONTAINER SECURITY SYSTEM USING WIRELESS COMMUNICATIONS

(75) Inventor: Richard C. Meyers, Longboat Key, FL (US)

(73) Assignee: System Planning Corporation, Arlington, VA (US)

( * ) Notice: Subject to any disclaimer, the term of this patent is extended or adjusted under 35 U.S.C. 154(b) by 137 days.

(21) Appl. No.: 11/598,842

(22) Filed: Nov. 14, 2006

(65) Prior Publication Data
US 2007/0115115 A1 May 24, 2007

Related U.S. Application Data

(60) Provisional application No. 60/735,842, filed on Nov. 14, 2005.

(51) Int. Cl.
*G08B 1/08* (2006.01)
(52) U.S. Cl. .............................. 340/539.13; 340/539.1; 340/426.13

(58) Field of Classification Search ............ 340/539.13, 340/539.19, 539.11, 539.1, 534, 426.13–426.22
See application file for complete search history.

(56) References Cited

U.S. PATENT DOCUMENTS

| | | | | |
|---|---|---|---|---|
| 5,565,858 A | * | 10/1996 | Guthrie | 340/10.33 |
| 5,686,888 A | * | 11/1997 | Welles et al. | 340/539.13 |
| 6,127,976 A | * | 10/2000 | Boyd et al. | 342/463 |
| 6,745,027 B2 | * | 6/2004 | Twitchell, Jr. | 455/422.1 |
| 7,098,784 B2 | * | 8/2006 | Easley et al. | 340/539.13 |
| 7,394,381 B2 | * | 7/2008 | Hanson et al. | 340/572.4 |
| 2004/0174259 A1 | * | 9/2004 | Peel et al. | 340/539.26 |

* cited by examiner

*Primary Examiner*—Daniel Previl

(57) ABSTRACT

A system and method for tracking a plurality of shipping containers which are designated as a specific group or lot is provided. The system may use the receiver range of a short range wireless communications device to track containers among themselves, or alternatively use a global positioning device in conjunction with a long range satellite or cellular communications device to report position back to a central monitoring station which utilizes a centralized method for tracking the container lots. An alarm condition is generated if any given container gets separated from the group or lot.

11 Claims, 6 Drawing Sheets

SYSTEM AND METHOD FOR LOT BASED PROCESSING AND TRACKING IN A CONTAINER SECURITY SYSTEM USING WIRELESS COMMUNICATIONS

CLAIM OF PRIORITY

The present invention claims priority to U.S. Provisional Patent Application No. 60/735,842, filed Nov. 14, 2005.

BACKGROUND OF THE INVENTION

1. Field of the Invention

The present invention relates generally to container security and supply chain management and, more particularly, to the tracking and coordination of a plurality of containers organized into groups or lots as a single shipment.

2. Background of the Invention

In today's efficiency conscious transportation environment, there is a strong need to cost-effectively and accurately track the location of containers, and groups of containers shipped together as a lot, at various stages during the supply chain. This need exists both in the United States and abroad.

Despite the strong need, few solutions, if any, have been able to provide the accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the location of each container during transport and in most cases the containers look very similar, so it is virtually impossible to ascertain the contents of containers without opening them up to inspect them. Furthermore, it is even more difficult to determine which containers are to be grouped together as a lot or shipment. In the transportation industry lots are used as a means of tracking a shipment or order. A lot can be made up of tens, hundreds, or thousands of a single item packed in multiple containers, or it can be comprised of an assortment of items used such as a kit of parts required for a single system packed into multiple containers.

Cargo vessels carry hundreds or thousands of containers and many of them look alike. These containers are stacked in the hull of these vessels and also stacked above decks as well. As part of the supply chain, containers are often loaded at the factory or distribution source, and then ideally will remain as a group unit or lot they reach their final destination. However, during the transit process containers may be moved several times. Due to the high number of containers and the number ports, warehouses, or stops a vessel or other transportation mode may encounter prior to the final destination, there is a reasonable probability that one or more of the containers designated as a member of a lot may be separated from the others. This scenario creates a huge problem in that incomplete shipments create a major issue for the suppliers, shippers, and purchasers or these goods.

As previously noted sea containers are often shipped in groups or lots. These lots may have common or inter-related cargo, come from the same manufacturer, be destined for the same delivery point, or have common paperwork linking the lot of containers together. These factors result in the desire to monitor and maintain knowledge of the location and status of all containers in the lot. This capability may improve efficiency and reduce attritions due to loss or theft.

3. Description of the Related Art

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device which is located on a container and performs multiple functions. Some of these functions may include controlling various sensors, collecting the data from these sensors and transmitting this data back to a central monitoring station. The central monitoring stations may also send commands and information to the device location in the each container.

To enable information to be transmitted to and from the container, there are several communications subsystems including a satellite or cellular communications device, or both. The SPC invention also describes the utilization of a short range wireless or local area communication channel to communicate with various sensors and other elements within the container. The system utilizes the satellite or cellular communications channel to communicate and send status and alarms to a central monitoring station.

A problem with the SPC invention is that it does not address the issues of tracking containers as lots or groups. Furthermore, the SPC invention does not go as far as to suggest utilizing either the GPS location or the short range wireless communications device to develop a system to track groups of containers.

SUMMARY OF THE INVENTION

To address the problems and limitations noted above, a system and method for tracking lots of containers as they move through various points in the supply chain is provided.

The embodiments of the present invention include several methods for tracking a plurality of containers as a single group or lot, using several communications and processing elements which are often performing other functions as well. In this manner there is little to no additional hardware cost of a tracking system which would normally monitor single containers independently. In one mode of operation, the present invention may utilize the receiver range of a short range wireless communications device to allow containers to "self-monitor" their proximity to each other member of the container lot. In an alternative mode, a global positioning device on a container may report back via a long range cellular or satellite channel to a central monitoring station, which in turn may calculate the status of any given lot of containers based on measuring the distance between individual containers and comparing them against a separation threshold.

Embodiments of the present invention comprise a system and method of tracking and maintaining groups of containers as they move through the supply chain. The benefits of this system are numerous and may increase efficiency and may also reduce attrition due to loss or theft.

The accompanying drawings, which are incorporated in and constitute a part of this specification, illustrate various

DESCRIPTION OF THE PREFERRED EMBODIMENTS

The present invention provides a unique system and method for providing tracking information of a plurality of shipping containers organized into lots or groups.

Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

Figure 1:
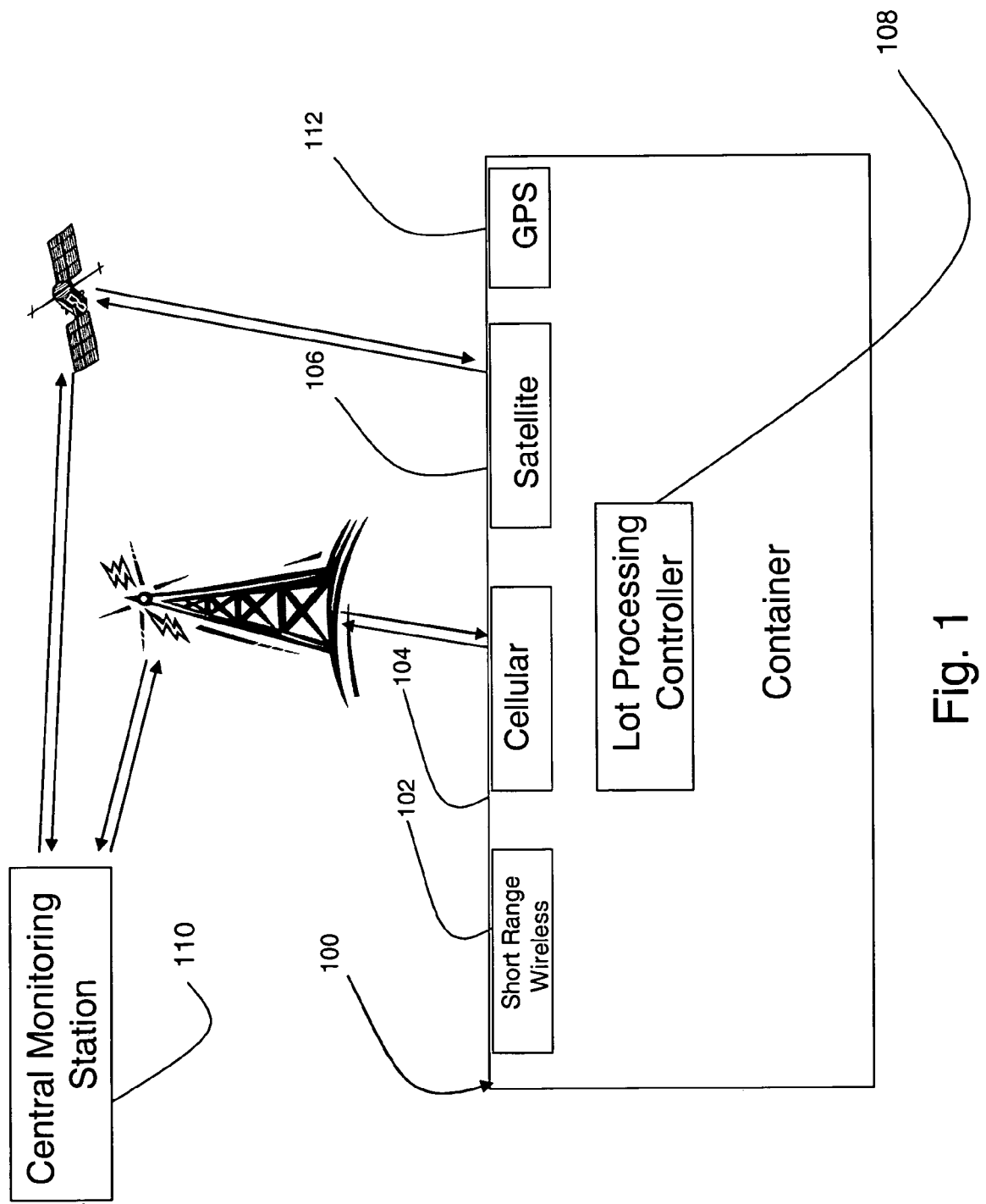
FIG. 1 shows a functional configuration of the various communication channels and the lot tracking controller according to an embodiment of the invention.

With reference now to FIG. 1, and for the purposes of explanation, the basic container lot tracking system of the present invention comprises three major communications sub-systems: a short range wireless communications channel 102; either a cellular communications channel or other longer range wireless communications channel 104; a satellite communications channel 106; or both 104 and 106 together. Each of these communications links is used in conjunction with a lot processing controller 108, and is mounted on the inside or outside of a container 100, usually near the door. A global positioning determination or Global Positioning System (GPS) device 112 interfaces with the controller 108 and provides accurate geolocation information. Ideally these communications subsystems along with the controller 108 and GPS device 112 are generally housed within a single unit, however may also be comprised of separate functional units under common control. The subsystems may be used for communication with a central monitoring station 110.

The short range wireless channel protocol or wireless local area network (WLAN) 102 may be any one of a number of standards such as Bluetooth, Zigbee, 802.11, or any other standards based or proprietary wireless protocol capable of transmitting data within a few feet to a several hundred feet.

The satellite channel 106 may include a satellite transceiver device, which may communicate with either geosynchronous (GEO) or Low Earth Orbit (LEO) satellite in a network. It may operate at any band commonly used by satellites including, but note limited to, C-band, Ku-band, L-Band, S-Band, or VHF.

The cellular channel 104 may include a device that typically may use one of the common cellular standards such as GSM, CDMA, or North American TDMA. However, for purposes of this invention the cellular channel is not strictly limited to these standards, but may also include other current and future standards, as well as any wireless protocol and network suited to transmit data over long distances.

Figure 2:
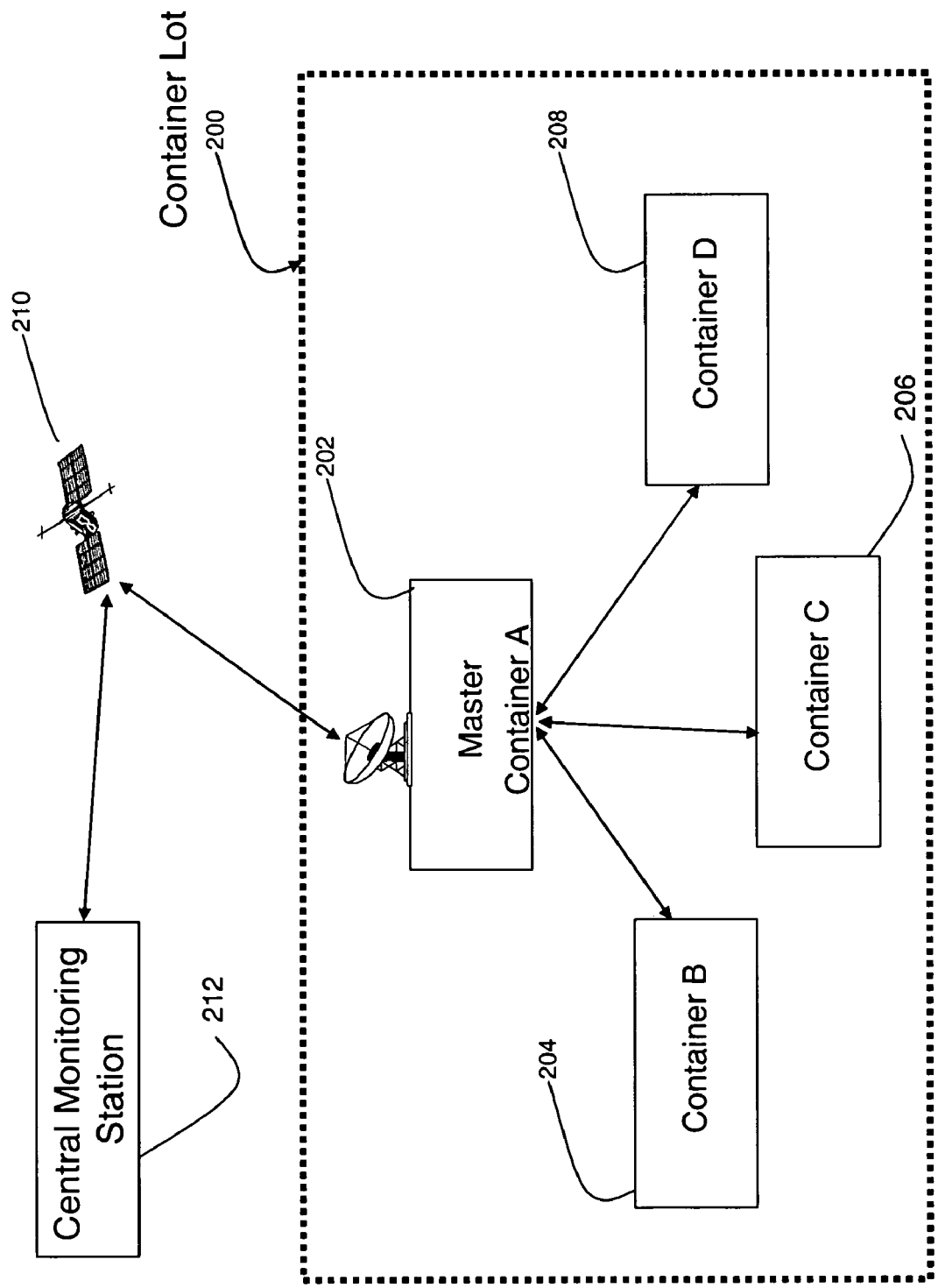
FIG. 2 shows multiple containers operating in a master-slave lot tracking application using the short range wireless communications device.
Figure 2A:
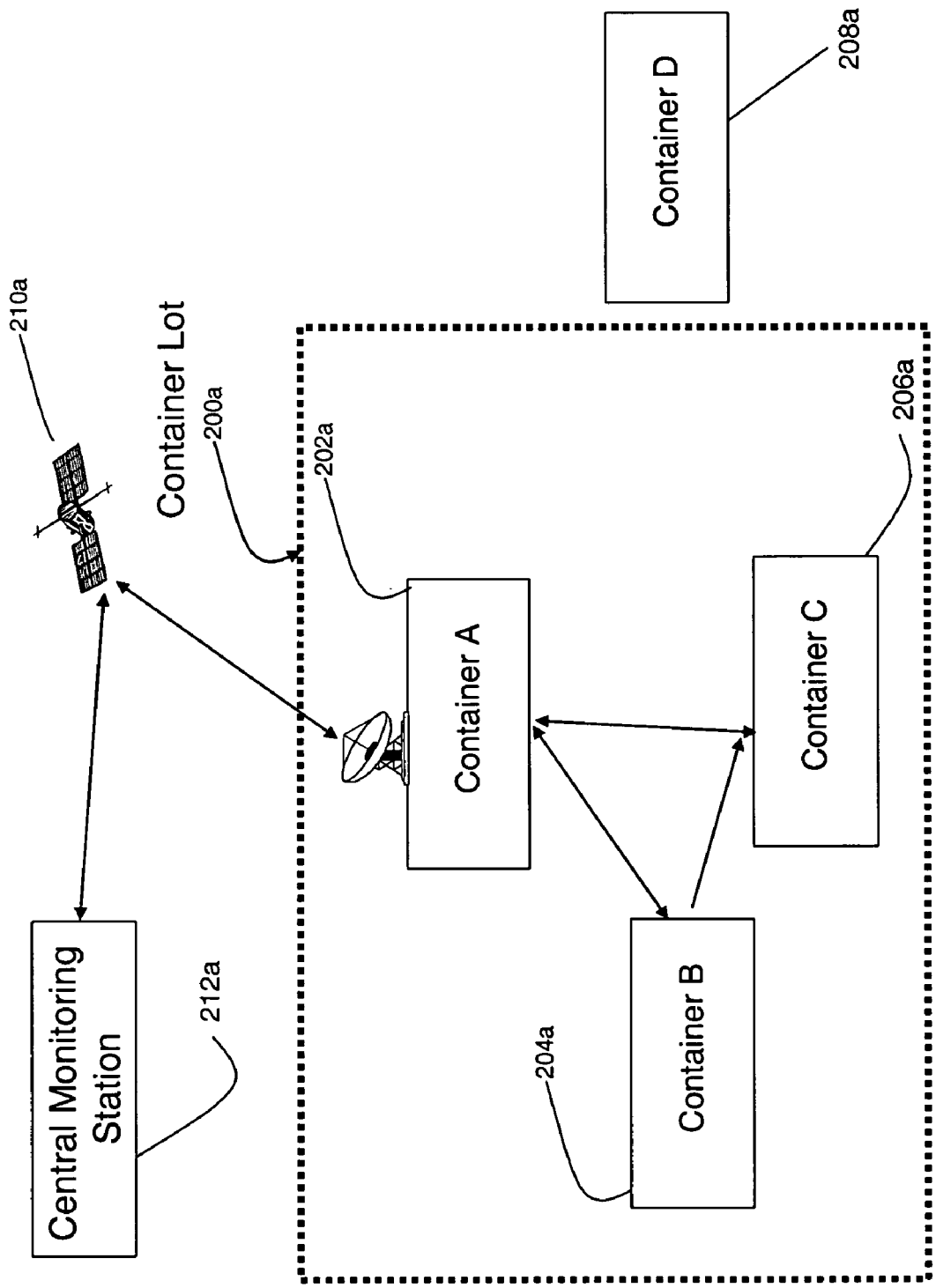
FIG. 2a shows multiple containers operating in a peer-to-peer lot tracking application using the short range wireless communications device.

There are two methods of which may be employed for lot tracking of a plurality of containers. The first method as shown in FIG. 2 and FIG. 2a uses the range of the short range wireless communication in either a master-slave or and a peer-to-peer based approach to query and collect information that is related to the container lot. The second method has each container independently send location information back to a central monitoring station which then determines the integrity of a lot of containers.

In the example shown in FIG. 2, the present invention has a plurality of containers designated to a unique group or lot 200. Of these containers a single one is assigned as a lot master container 202, and utilizes the short range wireless channel to communicate with the neighboring containers 204, 206, and 208.

Figure 5:
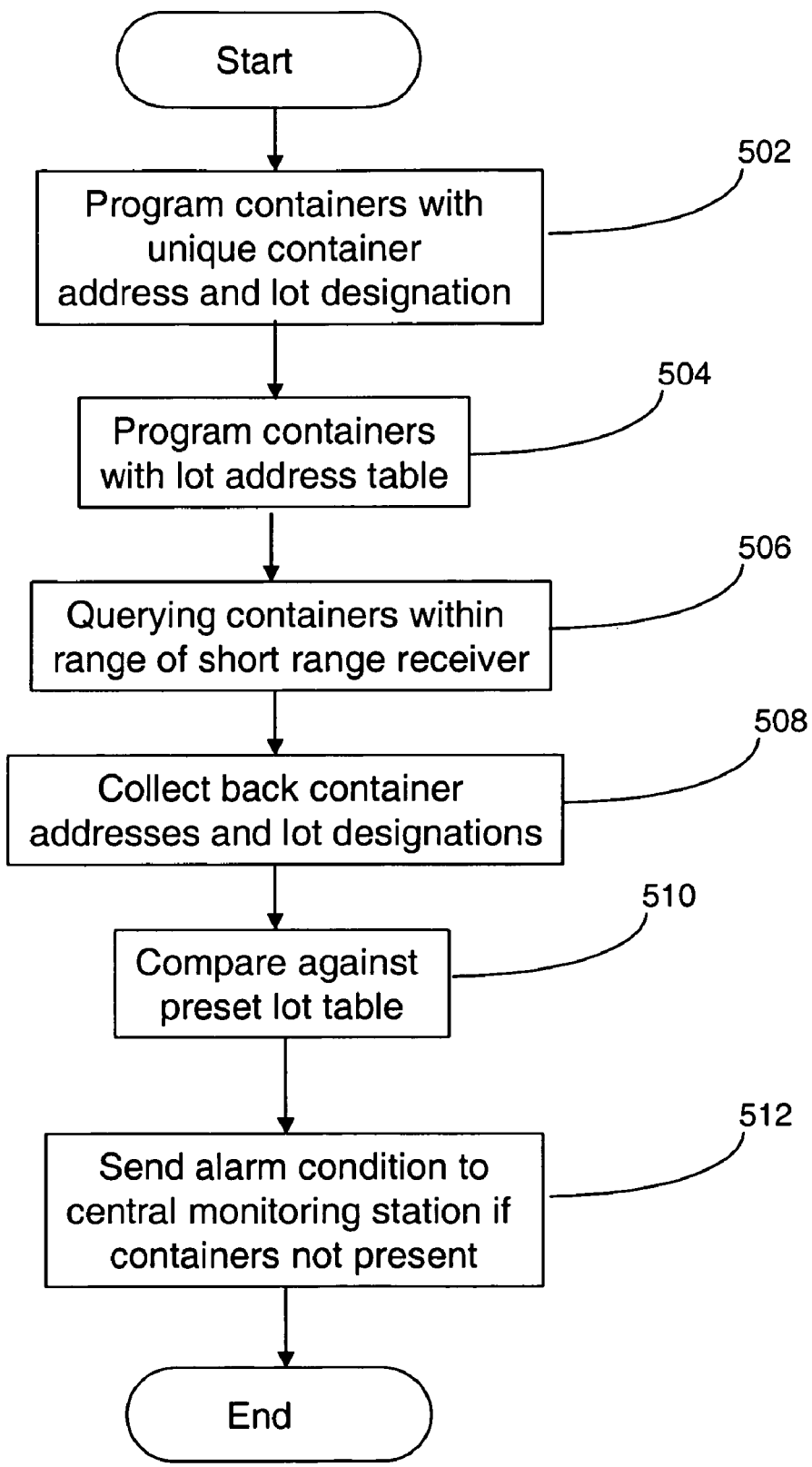
FIG. 5 shows a flow chart of the lot tracking method using the short range wireless communications device.

The method indicated in FIG. 5 applies to the system configuration of FIG. 2. As a container is readied for shipment from the original destination, the container may be programmed at 502 with a unique address and another designation of the lot or group to which said container belongs. The containers then may be programmed in step 504 with a table, which contains all of the container addresses belonging to that particular lot designation. Once the container is shipped, it is desirable to track the containers belonging to this particular lot together as a group. During transit, at step 506, the lot master container may query other neighboring containers, receive and collect back responses containing the specific container addresses and lot designations at 508, and then compare these against the lot address table at step 510. Should a particular container not be present in the lot group, the lot master container may then generate an alarm condition which is sent via satellite 210 to the central monitoring station 212. In addition, there may be an audible alarm from the master or absent container as well.

In an alternative configuration in FIG. 2A, the process is repeated on a peer-to-peer basis. In this case there is no designated master and each container within a given lot keeps track of its vicinity in relation to other containers in the lot. In the example in FIG. 2a, if any given container 208a should not be able to receive a message from other containers in the same lot, it may be determined that said container has fallen out of the group 202a, 204a, and 206a, at which point an alarm condition is sent back to a central monitor station 212a.

Figure 3:
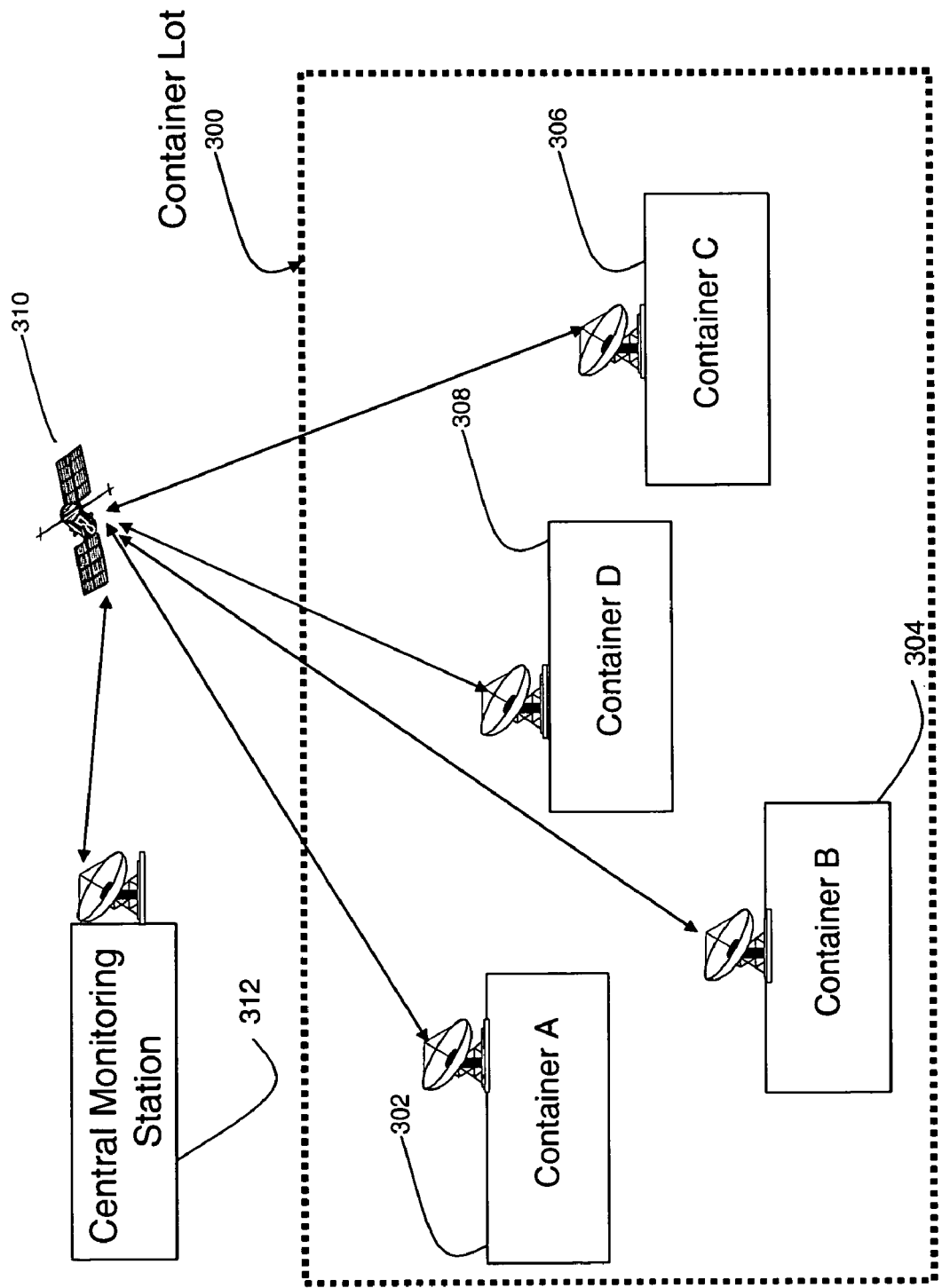
FIG. 3 shows multiple containers operating in a lot tracking application using the positioning device.

In the example shown in FIG. 3, the present invention tracks the location of a group or lot of containers through a central processing approach. In this case, each container 302, 304, 306, and 308 in a container lot 300 independently reports back location information to a central monitoring station 312 via satellite 310, the central monitoring station utilizing a method to determine lot integrity.

Figure 4:
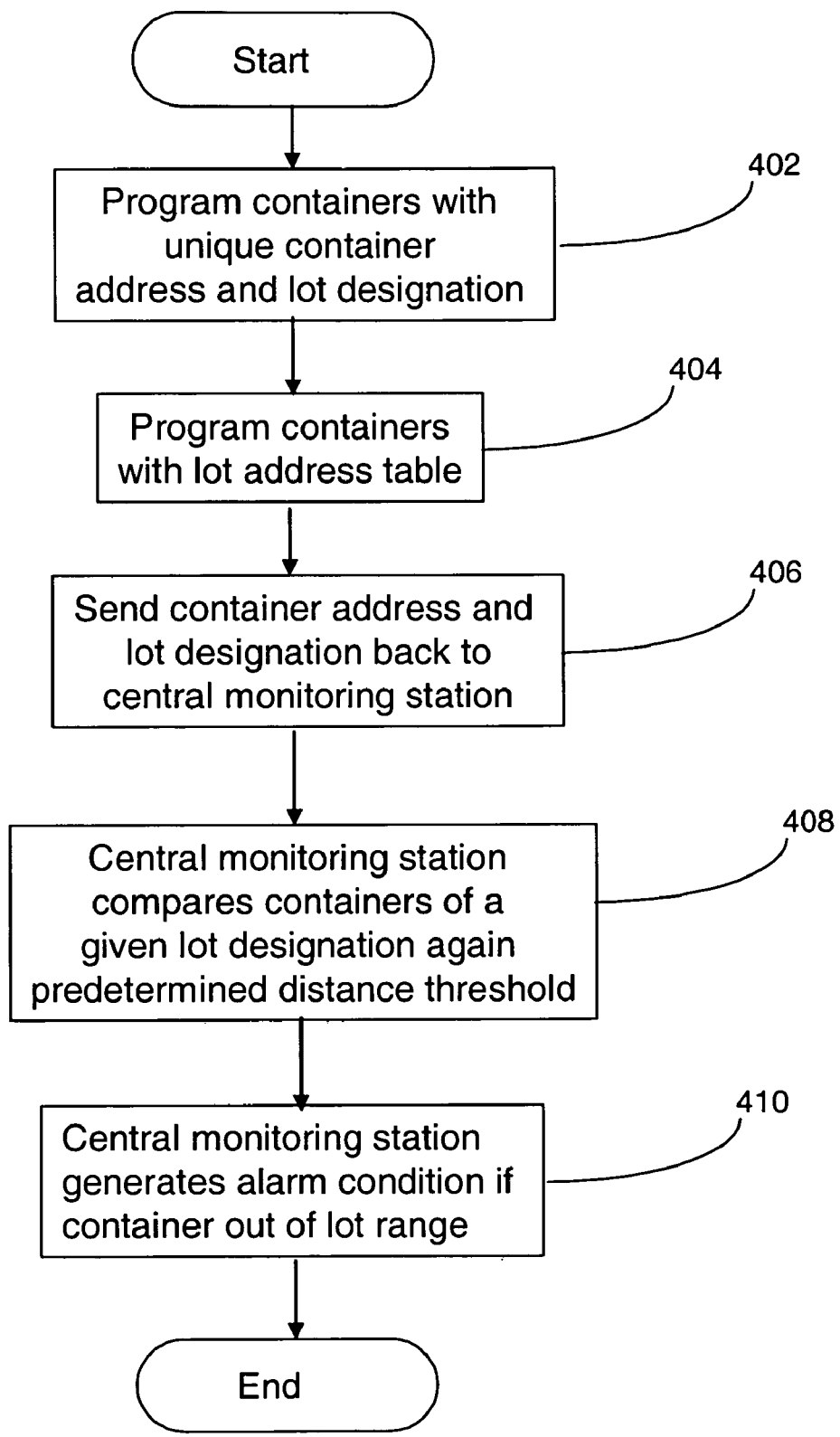
FIG. 4 shows a flow chart of the lot tracking method using the positioning device.

In FIG. 4, again as a container is readied for shipment from the original destination, the container may be programmed in step 402 with a unique address and another designation of the lot or group to which said container belongs. The containers then may be programmed in step 404 with a table, which contains all of the container addresses belonging to that particular lot designation. In step 406, each container may then send the container address and lot designation back to the central monitoring station, and the central monitoring station compares the data against a predetermined separation distance threshold at 408. Should this distance of any container exceed the separation distance threshold, then in step 410, the central monitoring stations may generate an alarm condition. This may also be an audible alarm emanating from the container itself.

What is claimed is:

1. A system for monitoring and tracking a plurality of containers organized in groups or lots, wherein each container is provided with a unique container address and lot designation, said system comprising:
    a short range wireless communications device associated with each container, each short range wireless communication device including a transmitter element and a receiver element;
    a position determination element; and
    a control element which dynamically tracks certain groups or lots of containers using the unique container addresses and lot designations; wherein, for any given lot of containers, at least one container is initially programmed with a preset table comprising all of the container addresses within a given lot designation; further wherein, one or more containers within a specific location are queried for their container address and lot designation; further wherein responses to queries from the containers are collected and compared against the preset table to determine if any containers are absent;
    and reporting an alarm condition if any of the containers are determined to be absent.

2. The system of claim 1, wherein the short range wireless communications device located on each container is capable of transmitting and receiving data and messages via a radio frequency signal at a maximum predetermined distance from a few feet to a several hundred feet.

3. The system of claim 2, wherein a short range wireless communication protocol comprises any one of standards including Bluetooth, Zigbee, 802.11 series, and a proprietary short range wireless channel.

4. The system of claim 1, wherein the system further comprises a long range communications device, comprising a cellular communications device including a transmitter element and a complementary receiver element located on each container, capable of transmitting data and messages to a central monitoring station, and receiving data and messages from the central monitoring station.

5. The system of claim 4, wherein the cellular communications device implements one of a cellular standard and a proprietary wireless protocol and network suited to transmit data over a network between long distances of at least hundreds of miles.

6. The system of claim 1, wherein the long range communications device comprises a satellite communications device including a transmitter element and a receiver element, wherein the satellite communications device communicates with either a geosynchronous (GEO) or Low Earth Orbit (LEO) satellite in a network.

7. The system of claim 1, wherein the position determination element is a Global Positioning System (GPS) receiver which is capable of ascertaining the position on earth and reporting this back to the control element.

8. A method for using a short range wireless communications device for dynamic tracking of a plurality of containers organized into a group or lot using a short range wireless communications device associated with each container, the method comprising:
    for any given lot of containers, initially programming each container with a unique container address and lot designation;
    for any given lot of containers, initially programming each container with a preset table comprising all of the container addresses within a given lot designation;
    querying each container for the container address and lot designation within the proximity of each short range receiver;
    collecting reports back from neighboring containers, the reports indicating the container address and lot number of the neighboring containers;
    comparing container addresses and lot designations against the preset table and determining if any containers are absent; and
    in the event of an absent container, reporting an alarm condition back to a central monitoring station.

9. The method of claim 8, wherein the method is performed on a peer based topology running on each container independently, and lot tracking is determined by a voting method and a open network request-acknowledge based protocol.

10. The method of claim 8, wherein the method is performed on a master-slave topology such that at a given time a single container is designated as a master container controlling the lot tracking for all other containers within the lot, and all other containers with a specified proximity are designated as slave containers.

11. A method for using a position determination device for dynamic tracking a plurality of containers organized into a group or lot using a short range wireless communications device associated with each container, the method comprising:
    for any given lot of containers, initially programming each container with a unique container address and lot designation;
    initially storing a unique table comprising all of the container addresses within a given lot designation in a database in a central monitoring station;
    for each container, transmitting the container address, lot designation, and container location back to a central monitoring station using a long range communications device;
    at the central monitoring station, comparing the location, container address, and lot designations for each container against the preset table;
    determining if any containers are physically located at a distance greater than a predetermined value from all other containers in the lot; and
    in the event that one or more of the containers are located at a distance greater than a predetermined value from all other containers, reporting an alarm condition.

* * * * *